United States Patent [19]
Koenig et al.

[11] 3,865,232
[45] Feb. 11, 1975

[54] PLOW SCRAPER FOR CONVEYOR BELTS

[75] Inventors: William E. Koenig, Newark; James T. Cunningham, Caldwell, both of N.J.

[73] Assignee: Litton Systems, Inc., Passaic, N.J.

[22] Filed: Sept. 11, 1973

[21] Appl. No.: 396,291

[52] U.S. Cl. .............................................. 198/230
[51] Int. Cl. .............................................. B65g 45/00
[58] Field of Search .......... 198/230, 188; 37/42 VL, 37/44, 46

[56] References Cited
UNITED STATES PATENTS

| | | | |
|---|---|---|---|
| 3,414,116 | 12/1968 | Oury | 198/230 |

FOREIGN PATENTS OR APPLICATIONS

| | | | |
|---|---|---|---|
| 299,329 | 2/1929 | Great Britain | 198/230 |
| 10,047 | 1/1913 | Great Britain | 198/188 |

*Primary Examiner*—Evon C. Blunk
*Assistant Examiner*—Douglas D. Watts
*Attorney, Agent, or Firm*—Morris I. Pollack

[57] ABSTRACT

A plow scraper for removing debris, such as dirt, mud and fine particles, adhering to the surface of a conveyor belt. Scraper includes a V-shaped metal frame, a depending flexible strip for each arm of the frame, a resilient scraper blade for each arm of the frame, and securing means extending through aligned apertures in the blades, and the frame so that the blades can be removed and replaced, when worn. Frame is secured for pivotal movement to a shaft that extends laterally across the belt, and the shaft, in turn, is joined to the framework of the conveyor at opposite sides of the belt. Roller is secured to frame so that resilient blades are pressed into contact with surface of belt to skim debris therefrom as belt is driven therebelow. Roller always projects beneath metal frame as the conveyor is driven past the plow scraper. When the scraper blades are worn, the roller enables the plow scraper to ride over the belt and the debris adhered thereto without causing the frequently encountered metal-to-metal and/or metal to belt engagement between the metal frame and the heavy duty staples that are used to join lengthy sections of conveyor belting or the belting itself. Consequently, the service life of the conveyor belt is increased substantially.

10 Claims, 3 Drawing Figures

PATENTED FEB 11 1975 3,865,232

3,865,232

PLOW SCRAPER FOR CONVEYOR BELTS

BACKGROUND OF THE INVENTION

1. Field of the Invention

This invention relates generally to scrapers for removing debris from conveyor belts, and more particularly to pivotally mounted plow scrapers with readily removable and replaceable resilient blades.

2. Description of the Prior Art

The desirability of providing a simple, effective and yet inexpensive device for removing debris from conveyor belts without damaging the belts has long been recognized. Numerous attempts have already been made to realize these goals with varying degrees of success.

For example, U.S. Pat. No. 2,545,882, granted to Harry Hall, discloses a roller spaced from the conveyor belt to be cleaned, a scraper strip mounted about the roller with an end projecting from the roller, a shaft spaced from the roller, a connecting element secured at one end to the roller and at the opposite end to the shaft, a pulley at one end of the shaft and a cable with a weight secured thereto passing over the pulley to apply a rotative force to the shaft to maintain the scraper strip in contact with the conveyor belt.

U.S. Pat. No. 2,545,883, also granted to Harry Hall, discloses a scraper blade supported between front and rear panels by a flexible strap that is joined to a shaft that extends between the front and rear panels along the length of the panels. A tension weight or spring applies a rotative force to a lever secured to one end of the shaft and then moves the upper end of the scraper blade upwardly from between the housing defined by the panels and into engagement with the surface of the conveyor belt. The weight continuously forces the scraper blade against the conveyor belt to be cleaned.

U.S. Pat. No. 3,414,116, granted to Robert T. Oury, discloses another variety of scraper assembly comprising a V-shaped scraper having a pair of metal scraper blades bolted to a W-shaped scraper bar. The ends of the bar are bolted to opposite sides of the frame of the conveyor, so that the scraper can be pivoted for maintaining a uniform scraping pressure across the width of the conveyor belt being cleaned as it passes under the scraper, as well as for permitting the scraper to ride over any unusually large or strongly adhered obstruction on the belt surface.

The scraper assembly employed by Oury is much simpler and much more feasible than the two relatively complex weight or spring tensioned assemblies disclosed in the Hall patents cited supra for the Oury scraper can ride over large obstructions. However, Oury does employ metal blades to scrape the conveyor belt. When such blades pass over the heavy duty staples that join together adjacent belt lengths, metal to metal contact is created at several points. Such contact, which becomes more pronounced as the conveyor belt starts to sag under its severe operating conditions, tends to pull the staples free and to downgrade, or even destroy, the seam between adjacent belt lengths. Obviously, the repair of the seam causes down-time on the conveyor and involves substantial expenses.

SUMMARY

Thus, with the deficiencies of the prior art scrapers clearly in mind, the instant invention contemplates a simple, effective and yet inexpensive plow scraper for removing debris from conveyor belts without damaging same. Such scraper is characterized by (1) readily removable and replaceable scraper blades, (2) a roller that elevates the plow scraper, even when the blades are worn, so that potentially harmful engagement between the blades and the belt and/or splice is avoided, and (3) a mounting arrangement that enables the plow scraper assembly to be secured to and removed from the frame of the conveyor in a modular fashion.

Other advantages attributable to the unique plow scraper will be readily apparent to the artisan when the specification is construed in harmony with the appended drawings.

DESCRIPTION OF THE PREFERRED EMBODIMENT

Figure 1:
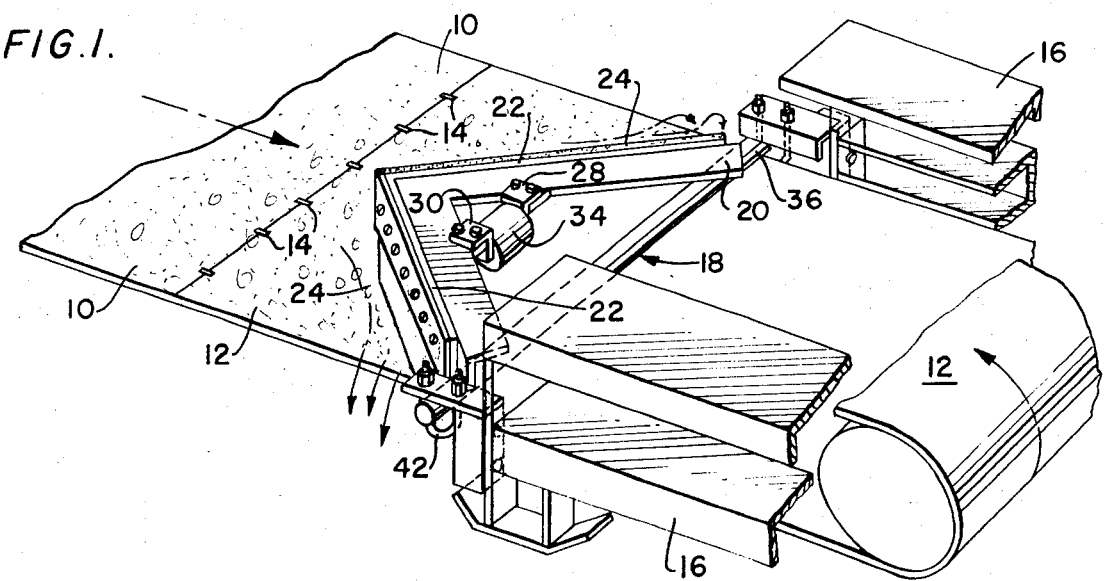
FIG. 1 is a perspective view of a plower scraper constructed in accordance with the principles of the instant invention.
Figure 2:
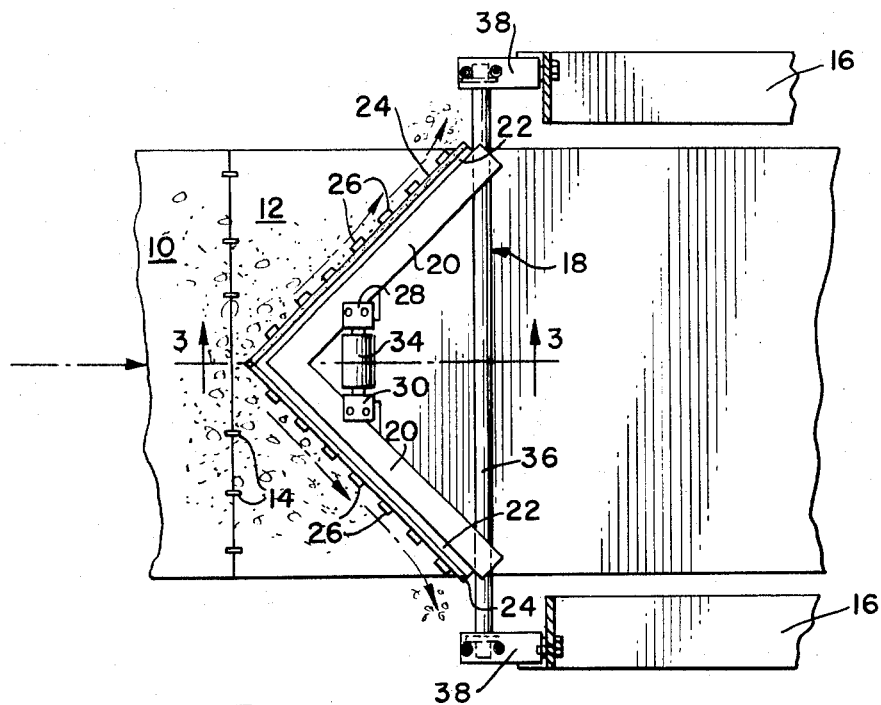
FIG. 2 is a top plan view of the plow scraper showing its relationship to a fragment of a conveyor belt.
Figure 3:
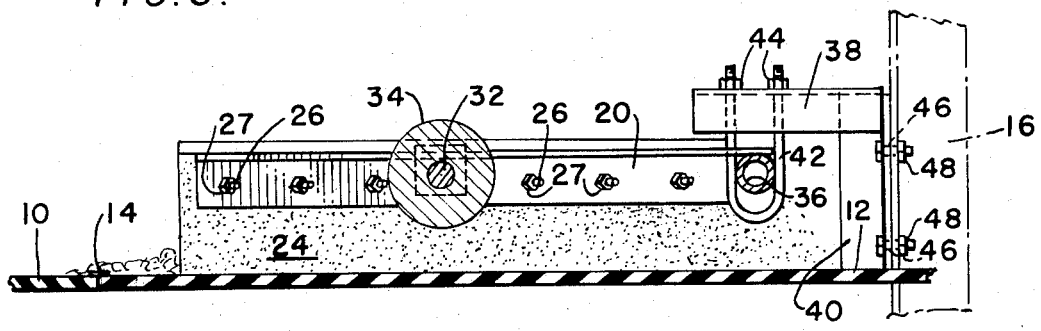
FIG. 3 is a vertical cross-sectional view of the plow scraper, such view being taken along line 2—2 in FIG. 2 and in the direction indicated.

Referring now to the drawings, FIGS. 1–3 depict a small segment of a first length of belt 10 that is joined to a second length of belt 12 by belt splice 14 to form a portion of one continuous, endless belt. The endless belt, which is usually made up of several lengths spliced together, is particularly well suited for use in a mine to transport materials, such as ore, salt, coal, and the like, from the tail end of the belt, at the working face of the mine, to the head end of the belt, to discharge such materials. Frequently, debris from the material being transported along the upper run of the belt (not shown) will adhere to the lower, or return, run of the belt. In order to remove such debris, which, when wet, may corrosively attack the belt, jam the power drives, and create other mischief, a plow scraper or like assembly is operatively associated with the lower run of the belt before the belt is driven around the tail pulley to begin its upper run. Fragments of the conveyor framework 16 are also visible. It will be noted that a representative location for the plow scraper is shown in FIGS. 1–3 on the return run of the conveyor belt upstream of the tail pulley, although other locations could also be utilized with equally satisfactory results.

The unique plow scraper constructed in accordance with the principles of the instant invention is identified generally by reference numeral 18. Assembly 18 comprises a V-shaped metal frame 20 fabricated from an angle-iron, a pair of scraper blades 22 and a metal back-up bar 24. The blades depend below the metal frame toward the conveyor belt 12, 10 passing therebelow. One blade is secured to each arm of frame 20 by bolts 26 that extend through aligned apertures in the blade, intermediate layer, and metal frame. Nuts 27 are secured to the inner ends of the bolts. When the blades, which are made of a resilient material such as rubber or plastic, become worn, they are unbolted and individually replaced.

The apex of the frame projects along the longitudinal centerline of the belt 10, 12 and the frame effectively opposes the movement of debris along the surface of the belt. Assembly 18 further includes a first bracket 28 and a second bracket 30 that are secured to frame 20 in the vicinity of the apex of the frame. A shaft 32 extends laterally between the brackets, and a roller 34 is supported by said shaft for rotatable movement. As shown in FIG. 3, the roller extends downwardly below the bottom edge of metal frame 20. Consequently, as resilient blade 22 is worn away because of its constant engagement with belt 10, 12, the metal frame can not contact the splice or belt.

Roller 34 also serves as a weight to cause frame 20 to pivot in a counter-clockwise direction about shaft 36 which is joined to the free ends of the frame. A mounting plate having a horizontal arm 38 and a vertical arm 40 is situated on each end of the shaft, and a U-bolt 42 with threaded ends is used to join each end of the shaft to the horizontal arm. Nuts 44 are advanced upon the threaded ends of the bolt to retain the bolt and the shaft in a floating position.

We claim:

1. In combination, a conveyor belt, a supporting framework situated on opposite sides of the belt and extending parallel thereto, a scraper assembly secured to said framework at opposite sides of the belt and means for advancing the belt relative to the scraper assembly, said assembly comprising:
    a. a V-shaped metal frame disposed with its apex extending along the longitudinal center line of the belt and with its sides extending from said apex rearwardly in the direction of belt travel and outwardly towards the sides of the belt;
    b. means for mounting said frame for pivotal movement about an axis extending laterally across the belt;
    c. resilent scraper blade means secured to said sides of said metal frame and extending therebelow so as to contact the belt surface and skim debris therefrom: and
    d. roller means secured to said metal frame for pivoting said metal frame downwardly to urge said blade means into contact with the surface of the belt, said roller means extending below bottom edge of said frame but being normally out of contact with the belt surface such that as said scraper blade means wears due to its coaction with the belt surface and any debris that said roller will approach the belt surface and will contact the belt surface before said metal frame does to thus prevent said metal frame from damaging the belt surface.

2. The combination as defined in claim 1 wherein said blade is disposed intermediate said frame and a back up bar.

3. The combination of claim 1 wherein said roller means is secured to the sides of the metal frame rearwardly of the apex of the frame and parallel to the means for mounting said frame for pivotal movement.

4. The combination as defined in claim 1 wherein each resilient blade is joined to the frame by fastening means which are passed through aligned apertures in the blade and frame, thus allowing the blades to be removed and replaced when worn.

5. The combination as defined in claim 1 wherein said means for mounting said frame includes a shaft secured to the free ends of said frame, and U bolts for receiving therein the ends of said shaft.

6. The combination as defined in claim 1 wherein said scraper assembly can be removed, as a unit, from said framework.

7. A scraper assembly for removing debris and the like from the surface of a conveyor belt, said assembly comprising:
    a. a V-shaped metal frame adapted for disposition with its apex projecting along the longitudinal center line of a conveyor belt, and with its sides extending rearwardly from said apex in the direction of travel of the conveyor belt, and outwardly therefrom towards the sides of the conveyor belt;
    b. means mounting said frame for pivotal movement;
    c. resilent scraper blade means secured to said sides of said metal frame and normally extending below said metal frame a predetermined distance; and
    d. spacer means secured to said metal frame to urge said metal frame downwardly and said resilent scraper blade means into contact with the surface of a conveyor belt when disposed in proximity thereto such that debris and the like will be removed from the conveyor belt;
    e. said spacer means extending below said metal frame but less then said predetermined distance to co-operate with the conveyor belt and prevent said metal frame from contacting the conveyor belt in case said resilient scraper blade means should wear down.

8. The scraper assembly as defined in claim 7 wherein said resilient scraper blade means is located between a back-up bar and said metal frame, and openings are formed in said blade means, said back-up bar, and said frame and fastening means coacting therewith provide for removal and replacement of said blade means.

9. The scraper assembly as defined in claim 7 wherein said means mounting said frame for pivotal movement also provides for a floating movement thereof in a direction away from and towards a conveyor belt when said frame is in proximity thereto.

10. The scraper assembly of claim 7 wherein said spacer means includes a roller secured to the sides of the metal frame rearwardly of the apex of the frame and parallel to the means for mounting said frame for pivotal movement.

* * * * *